United States Patent [19]

Motoyama

[11] Patent Number: 5,537,554
[45] Date of Patent: * Jul. 16, 1996

[54] METHOD AND APPARATUS FOR CONTROLLING AND COMMUNICATING WITH BUSINESS OFFICE DEVICES

[75] Inventor: Tetsuro Motoyama, San Jose, Calif.

[73] Assignees: Ricoh Company, Ltd., Tokyo, Japan; Ricoh Corporation, San Jose, Calif.

[*] Notice: The term of this patent shall not extend beyond the expiration date of Pat. No. 5,412,779.

[21] Appl. No.: 426,679

[22] Filed: Apr. 24, 1995

Related U.S. Application Data

[63] Continuation of Ser. No. 282,168, Jul. 28, 1994, Pat. No. 5,412,779, which is a continuation of Ser. No. 902,462, Jun. 19, 1992, abandoned, which is a continuation of Ser. No. 549,278, Jul. 6, 1990, abandoned.

[51] Int. Cl.[6] .................................................. G06F 3/00
[52] U.S. Cl. .......................... 395/280; 355/203; 358/442; 395/183.22
[58] Field of Search .................................. 395/235, 275, 395/200, 280, 200.05, 856, 183.01, 183.22; 355/203, 204, 205, 207; 358/442

[56] References Cited

U.S. PATENT DOCUMENTS

| | | |
|---|---|---|
| 4,583,834 | 4/1986 | Seko et al. . |
| 4,685,124 | 8/1987 | Smitt et al. . |
| 4,947,345 | 8/1990 | Paradise et al. ............ 364/519 |
| 4,965,676 | 10/1990 | Ejiri et al. ................. 358/406 |
| 5,038,319 | 8/1991 | Carter et al. . |
| 5,057,866 | 10/1991 | Hill, Jr. et al. . |
| 5,084,875 | 1/1992 | Weinberger et al. .......... 395/183.22 |
| 5,257,069 | 10/1993 | Hirata et al. . |
| 5,325,156 | 6/1994 | Ulinski ..................... 355/209 |
| 5,373,349 | 12/1994 | Ito . |
| 5,384,622 | 1/1995 | Hirata et al. . |
| 5,386,271 | 1/1995 | Maekawa et al. . |
| 5,394,458 | 2/1995 | Allen et al. ................ 379/1 |
| 5,412,779 | 5/1995 | Motoyama ................ 395/275 |

FOREIGN PATENT DOCUMENTS

| | | |
|---|---|---|
| 0212335 | 3/1987 | European Pat. Off. . |
| 0241255 | 10/1987 | European Pat. Off. . |
| 3921617 | 1/1990 | Germany . |
| 58-125950 | 7/1983 | Japan . |
| 1-202966 | 8/1989 | Japan . |
| 2227112 | 7/1990 | United Kingdom . |

OTHER PUBLICATIONS

Official Minutes of the ad hoc group "Remote Maintenance" of the FTZ Work Group, Text/Fax of the first meeting of Jun. 13, 1988 of the *Verband Deutscher Maschinen-und Anlagenbau e.v.* (VDMA), Fachgemeinschaft Buro und Informationstechnik with Document AG T/F–D Nr. 88/02 (With partial English translation).

*Primary Examiner*—Jack B. Harvey
*Assistant Examiner*—Glenn A. Auve
*Attorney, Agent, or Firm*—Oblon, Spivak, McClelland, Maier & Neustadt

[57] ABSTRACT

A method and apparatus for controlling and communicating with business office devices, such as copiers, facsimiles and/or printers. The present invention communicates and controls various modules of business devices which allow an external device such as an operation panel to access the state of a target device, such as a copier, printer or facsimile. The operation panel can communicate with the target device and control the same target device. Also, a remote diagnostics station can provide remote diagnostics of the target device.

69 Claims, 5 Drawing Sheets

TYPE

| b7 | b6 | b5 | b4 | | | | b0 |
|----|----|----|----|---|---|---|----|
| 0  |    |    |    |   |   |   |    |

INFORMATION / TYPE NUMBER

- 00 NORMAL
- 01 ERROR
- 10 COMPOSITE
- 11 URGENT

1–30 TYPE

11111 EXTENSION.....00H 00H

LENGTH

| b7 | b6 | b5 | | | | | b0 |
|----|----|----|---|---|---|---|----|
| 1  | 0  |    |   L <= 63   |

| b7 | b6 | b5 | | | | | b0 |
|----|----|----|---|---|---|---|----|
| 1  | 1  |    |  0 < K <= 63  |

FOLLOWING K BYTES SPECIFY THE LENGTH

| b7 | b6 | b5 | b4 | b3 | b2 | b1 | b0 |
|----|----|----|----|----|----|----|----|
| 1  | 1  | 0  | 0  | 0  | 0  | 0  | 0  |

...00H 00H

INDEFINITE

*FIG. 3*

| Engine Power On | Panel Power On | Data | Comment |
|---|---|---|---|
| 1 ↓ | | 02, 81, 02 | Identifying as Ope. Panel Engine is busy for power-on reset |
| 2 ↑ | | 02, 81, 01 | Engine identifying itself |
| 3 ↓ | | 01, 81, 02 | Ack Identify (02) |
| 4 ↓ | | 02, 81, 02 | First Identify timed out. Try again |
| 5 ↑ | | 01, 81, 02 | Ack Identify (02) Connection established. |
| 6 ↓ | | 03, 81, 04 | # of copies specified. |
| 7 ↑ | | 01, 81, 03 | Ack # of copies (03) |
| 8 ↓ | | 04, 80 | Start |
| 9 ↑ | | 01, 81, 04 | Ack Start (04) |
| 10 ↑ | | 61, 80 | Paper Jam |
| 11 ↓ | | 01, 81, 61 | Ack Paper Jam |

FIG.—4

| ENGINE | DIAG. | DATA | COMMENT |
|---|---|---|---|
| 1 | ←---- | 02, 81, 03 | IDENTIFYING DIAGNOSTIC SYSTEM |
| 2 | ----→ | 01, 81, 02 | ACK IDENTITY |
| 3 | ←---- | 06, 81, 01 | INQUIRY IDENTITY |
| 4 | ----→ | 41, 86, 01, 81, 06, 07, 81, 01 | COMPOSITE ACK. ACK INQUIRY & REPORT MODEL = 1 |
| 5 | ←---- | 06, 81, 02 | INQUIRY MODEL |
| 6 | ----→ | 41, 86, 01, 81, 06, 07, 81, 02 | COMPOSITE ACK. ACK INQUIRY & REPORT MODEL = 2 |
| 7 | ←---- | 09, 84, 00, 01, 00, 02 | PARAMETERS (1, 2) REPORT |
| 8 | ----→ | 21, 81, 09 | COMMAND NOT UNDERSTOOD |
| 9 | ←---- | 08, 84, 00, 00, 01, C1 | REPORT ADDRESS (01C1) CONTENT |
| 10 | ----→ | 01, 81, 08 | ACK |
| 11 | ←---- | 07, 87, 00, 00, 01, C1, 3D, FF | REPORT 01C1 = FF |
| 12 | ----→ | 01, 81, 07 | ACK |

*FIG. 5*

METHOD AND APPARATUS FOR CONTROLLING AND COMMUNICATING WITH BUSINESS OFFICE DEVICES

This is a continuation of application Ser. No. 08/282,168, filed on Jul. 28, 1994, now allowed as U.S. Pat. No. 5,412,779, which is a continuation of application Ser. No. 07/902,462, filed on Jun. 19, 1992, now abandoned, which is a continuation of Ser. No. 07/549,278, filed Jul. 6, 1990, now abandoned.

BACKGROUND OF THE INVENTION

The present invention relates to a method and apparatus for communicating and controlling various types of business office equipment or devices transparently and uniformly. The types of business equipment could be copiers, facsimiles and/or printers.

The creation of business office devices such as a copier, facsimile or printer requires activities assigned to various groups which must be integrated into at a certain time. In addition, once the device goes to customers, it must be maintained by a field service group. Therefore, different groups of people work together to develop and maintain the product.

The current trend of using microprocessors in business devices increased the capability of the devices. For example, high speed copiers usually have more than one microprocessor performing various tasks, including an operation panel consisting of many buttons and displays, controlled by a microprocessor.

As the use of microprocessors increases, a shortage of software engineers becomes critical. Fathi and Armstrong (1985) showed the cost ratio of development between hardware and software as 1 to 5.3. The current practice of developing devices, particularly stand-alone devices such as copiers, tends to ignore reusability of software across different models. For example, an operation panel of a copier is programmed by an engineer who develops the software of the main controller. The software is closely tied to a particular model and usually cannot be used by other copier models. If this trend does not change, the development of various modules by different groups cannot be easily integrated. Moreover, the shortage of software engineers is likely to limit the number of product developments and modification.

SUMMARY OF THE INVENTION

The foregoing problems can be solved and product development cycles can be shortened by providing a means and corresponding method to communicate and control various modules of a device across models and products. This allows several groups to start developing modules using existing devices rather than waiting for a target device to be developed. In addition, field service organization can support diagnostic and maintenance activities with one intelligent system, rather than having different systems for various products.

It is therefore an object of the present invention to provide an improved means and method of allowing an external device or devices to access the state of the target device(s), to communicate with the target device(s) and to control the target device(s).

Additional objects, advantages and novel features of the present invention will be set forth in part in the description which follows and in part become apparent to those skilled in the art upon examination of the following or may be learned by practice of the invention. The objects and advantages of the present invention may be realized and attained by means of the instrumentalities and combinations which are pointed out in the appended claims.

BRIEF DESCRIPTION OF THE DRAWINGS

The accompanying drawings which are incorporated in and form a part of this specification illustrate and embodiment of the invention and, together with the description, serve to explain the principles of the invention.

DETAILED DESCRIPTION OF THE INVENTION

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
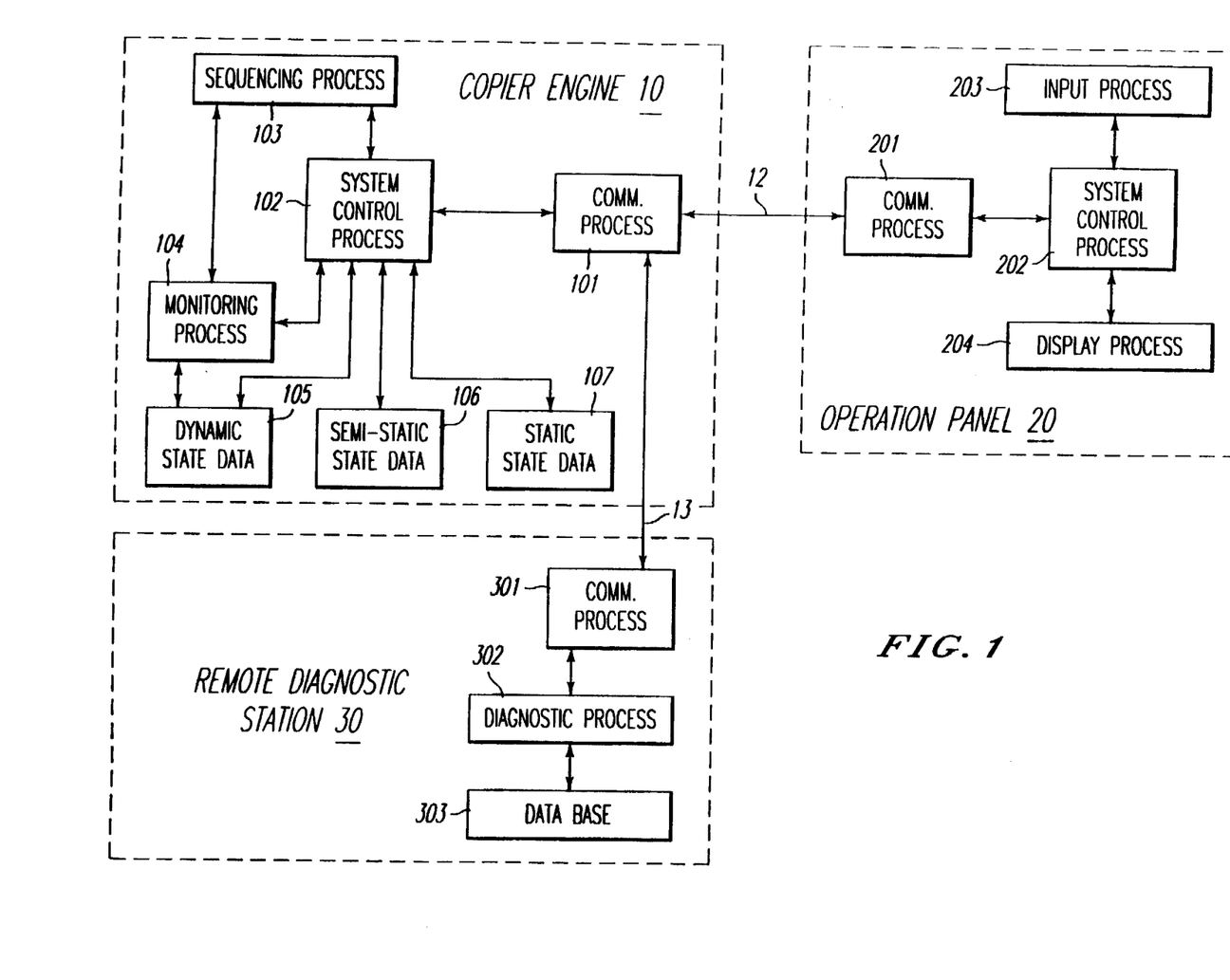
FIG. 1 depicts a functional system overview under which the present invention can be applied.

FIG. 1 illustrates a preferred embodiment of the present invention including a copier engine 10, operation panel 20, and remote diagnostic station 30. However, the present invention is not limited to copier devices, and can be applied to other business equipment devices, such as a printer or facsimile, which has means which are described below.

In the following illustration, the target device in FIG. 1 is a copier engine 10. The target device 10 includes means to store Static State Data 107, which does not change over the life of the device, such as the model number, serial number, model characteristics and the like. Target device 10 includes means to store Semi-Static State Data 106, which may change over the life of the device infrequently, such as the ROM version, option configuration, and the like.

In addition, the target device has means to store Dynamic State Data 105, which changes according to the mechanical state of the device, such as the paper status in the tray, oil, toner, number of prints, sensitivity of the photoreceptor, paper path and location, and the like. In order to store the dynamic state of the device, the target device 10 includes Monitoring Process 104 to monitor the state of device 10. Overall system activities are coordinated by System Control Process 102.

At power-on time, System Control Process 102 not only brings up the target device 10, but also establishes the communication with attached devices by first checking the physical connection and then establishing the communication by means which will be described below.

Copier engine 10 is idle until a user specifies some function through Operation Panel 20. During the idle time, however, System Control Process 102 continuously monitors its state through Monitoring Process 104. If abnormal states are detected, System Control Process 102 sends data to Communication Process 101, which codes data and sends the coded data to the Operation panel 20 through communication media line 12. Communication Process 201 sends acknowledgement, decodes data and sends it to System Control Process 202. System Control Process 202 then notifies the state of Copier Engine 10 through Display Process 204.

If communication line 13 to Remote Diagnostic Station is connected, System Control Process 102 can send a message to get the attention of Remote Diagnostic Station 30 to notify station 30 of an abnormal state.

Input Process 203 receives input from a user and sends the data to System Control Process 202, which then echoes back the input through Display Process 204, so that the user can get feedback of his/her input. The data from the user is then coded in Communication Process 201. The coded data is then sent to Copier Engine through line 12.

Communication Process 101 then sends an acknowledgement to 201, decodes the received data and sends the decoded data to System Control Process 102. During the actual copying, Sequencing Process 103 sequences events according to timing requirements. Remote Diagnostic Station 30 is connected with Copier Engine 10 through line 13, which can be a telephone line, RS232 line, or any other suitable communication means. Communication process 301 acts similarly as process 101 and process 201 of engine 10 and panel 20, respectively.

Diagnostic Process 302 is an intelligent process which can communicate interactively with Copier engine 10 based upon the responses it receives and data accumulated in the Data Base 303.

Figure 2:
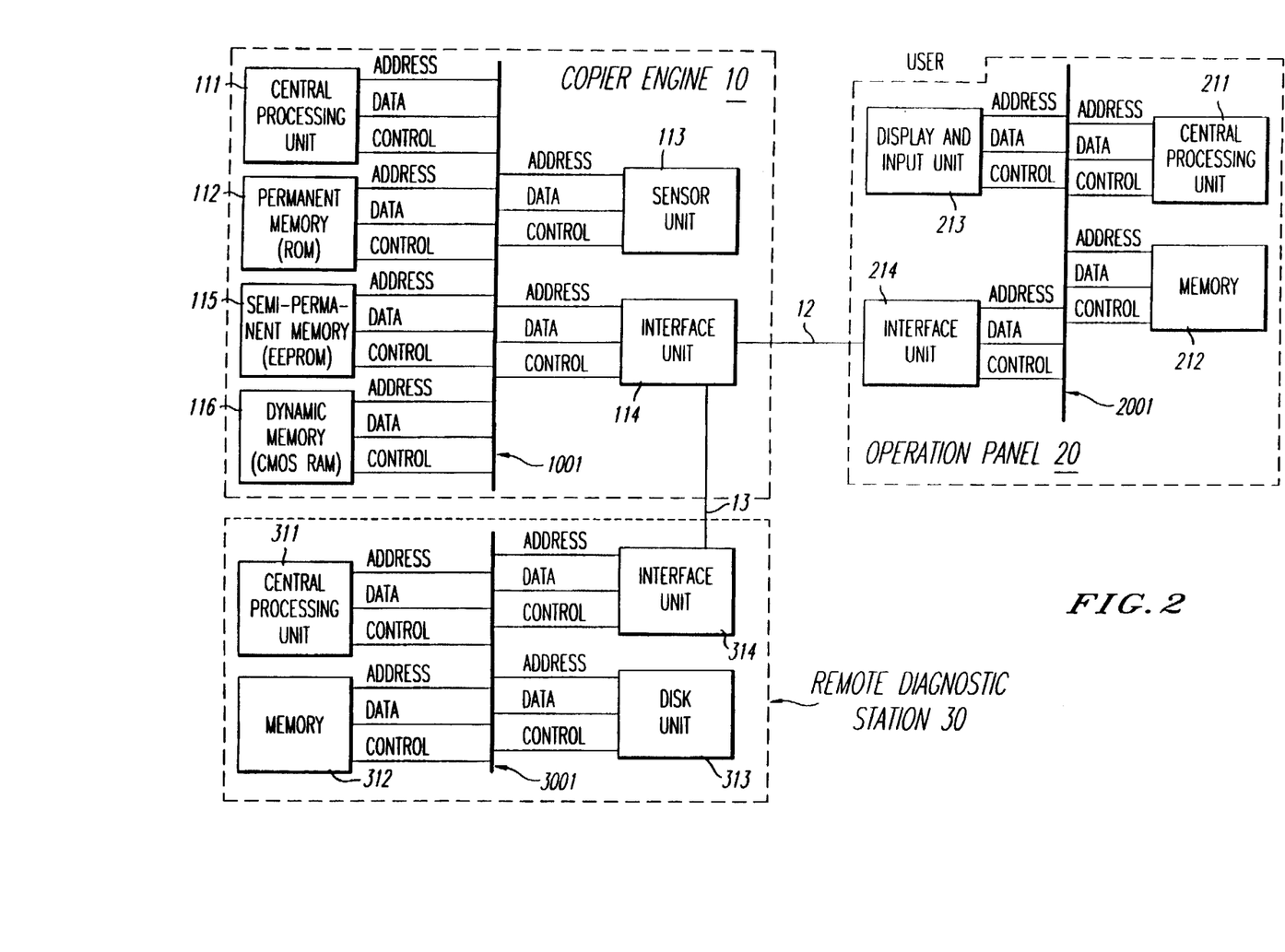
FIG. 2 depicts the hardware aspects of an implementation of the present invention.

FIG. 2 illustrates hardware features utilized to implement the present invention. All devices 10, 20, 30 have buses 1001, 2001, and 3001, which connect Interface Units 114, 214, and 314 respectively. Depending upon the model, a bus could have more units. Sensor unit 113 senses the mechanical states of the target device which must be stored as Dynamic Data, such as paper tray, voltage and paper path.

Memory 112 holds Static State Data 107 as a permanent memory (such as ROM). Memory 115 stores Semi-Static State Data 106 in changeable memory which does not require power, such as EEPROM, or which uses low power and can be supported by a battery (CMOS RAM). Memory 116 stores Dynamic State Data 105 in a changeable memory, which does not require power or which uses low power and can be supported by a battery.

Display and Input Unit 213 controls input keys and displays, such as lights and LCD. Disk unit 313 holds the data base. If the communication line 13 is not connected regularly or gets connected only when diagnostics are needed, the Interface Unit 114 has a means to notify Central Processing Unit 111 that line 13 is connected, such as an interrupt caused by mechanical means of physical connection.

Figure 3:
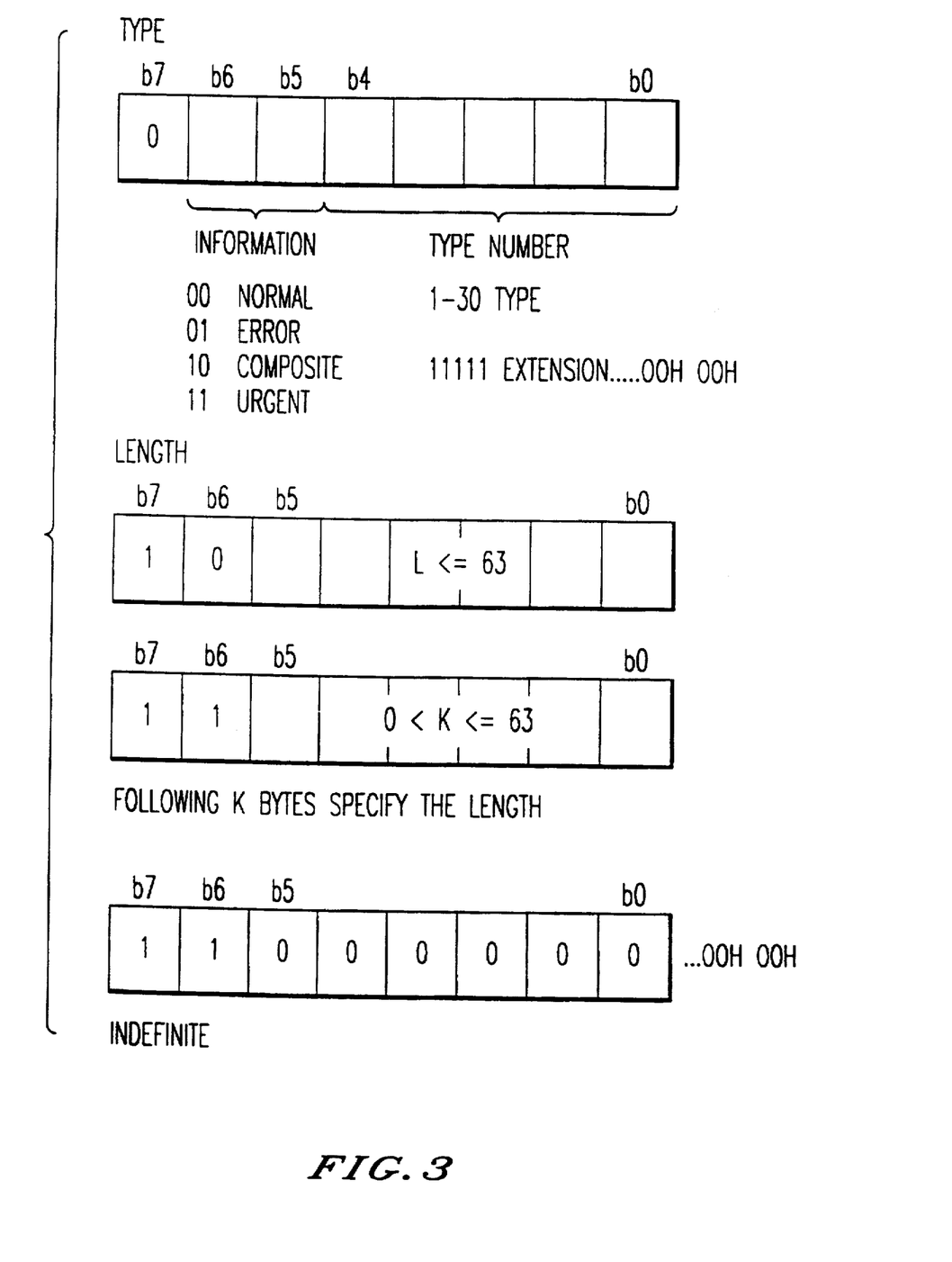
FIG. 3 depicts an encoding scheme which can be used for communication with the present invention.

FIG. 3 illustrates a preferred embodiment of encoding according to the present invention. However, other encoding such as ASN.1 (1987) can be used instead. The encoding scheme in FIG. 3 consists of sending Type, Length and Value (TLV) encoding. Bit 7 of Type is set to 0 while bit 7 of Length is set to 1. Values can take any bit combination. The encoding is binary to save the length of the data communication. Combined with the information field, up to 120 types (4 information×30 types) can be defined. One method to extend the type is to set all low 5 bits to 1. The terminator of this extension is two bytes of 00H. Using Composite in the information field, more than one information can be sent as follows:

010xxxxx L1 T2 L2 V2 T3 L3 V3 where L1 is the byte length of T2 through V3. L2 is the byte length of V2, and L3 is the byte length of V3. Composite is not limited to two.

Table 1 below shows codes for Type and Value. These codes are shown as an illustration, and actual implementation may vary depending upon the application.

TABLE I

| Information | Type and Value | |
|---|---|---|
| | Type | Content |
| 00 | 1 | Acknowledgement |
| 00 | 2 | Identify |
| 00 | 3 | # of Copies |
| 00 | 4 | Start |
| 00 | 5 | Done |
| 00 | 6 | Inquiry |
| 00 | 7 | Report |
| 00 | 8 | Address Content Report |
| 00 | 9 | Parameter Report |
| 01 | 1 | Command Not Understood |
| 10 | 1 | Composite Acknowledgement |
| 11 | 1 | Jam |
| | Identify Values | |
| | 1 | Copier Engine |
| | 2 | Operation Panel |
| | 3 | Diagnostic |
| | Inquiry Values | |
| | 1 | Identity |
| | 2 | Model |

Figure 4:
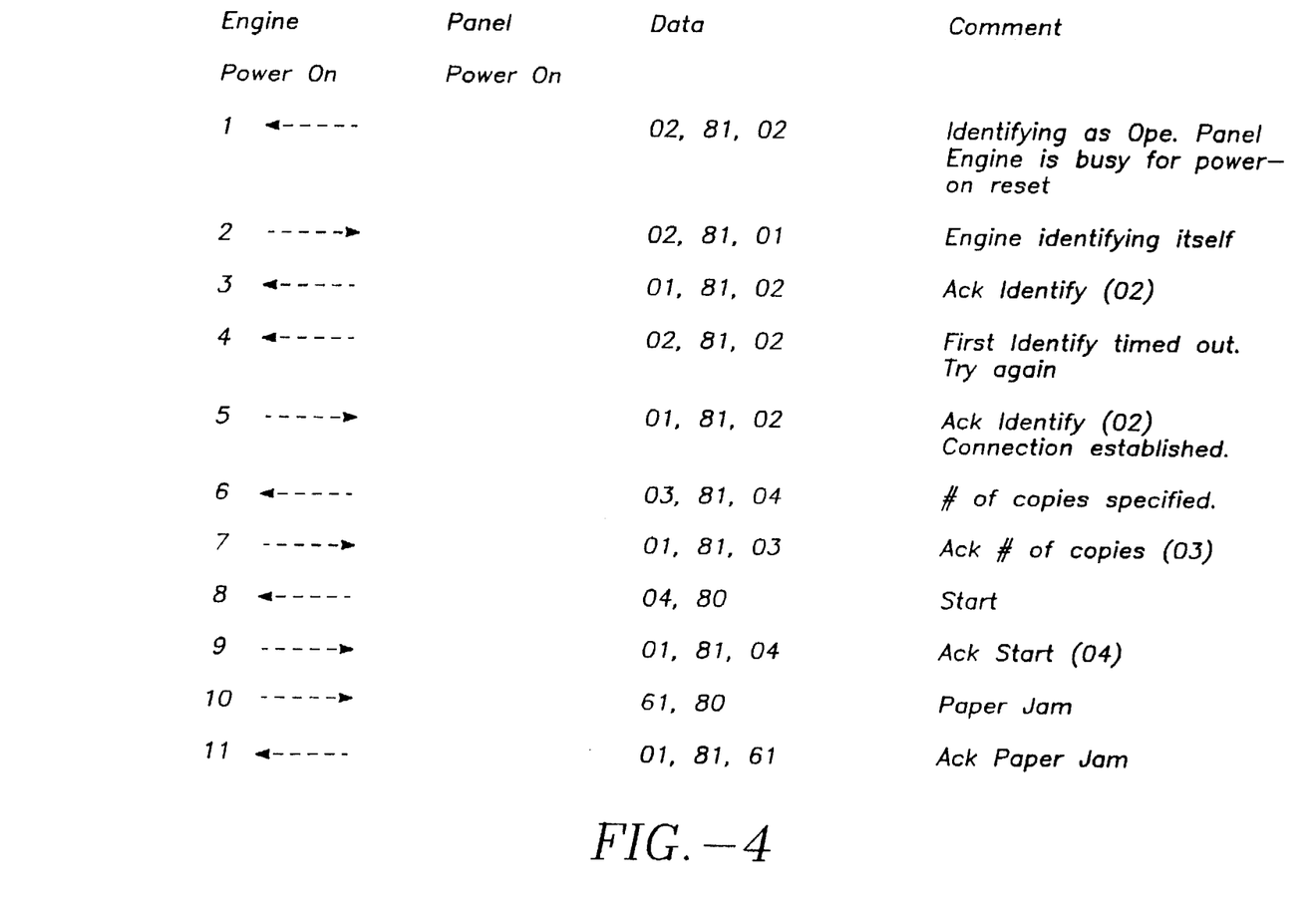
FIG. 4 depicts an example of a handshake between a copier engine and operation panel after power-up.

FIG. 4 illustrates the establishment of communication between engine 10 and operation panel 20 of FIGS. 1 or 2 after power-on. Both engine 10 and operation panel 20 go through power on reset sequence. At step 1, operation panel 20 finishes the reset and sends its assigned value to engine 10. However, engine 10 is still busy with reset and cannot receive the data through the interface unit 101.

At step 2, engine 10 is ready and sends the assigned value to panel 20. Step 3 shows the acknowledgement from panel 20 to engine 10. In a preferred embodiment, the receiving side must return the acknowledgement with the received Type.

In FIG. 4, step 4 illustrates that a First Identify has timed out end another attempt should be made.

Step 5 illustrates that the connection has been established.

Step 6 illustrates an example of the number of copies specified and the acknowledgement in step 7 reflects the number of copies (here, 3 copies).

Step 8 illustrates the start of the copying sequence, and step 9 indicates the corresponding acknowledgement.

Step 10 illustrates the communication of a paper jam, and step 11 illustrates the corresponding acknowledgement of that paper jam.

Figure 5:
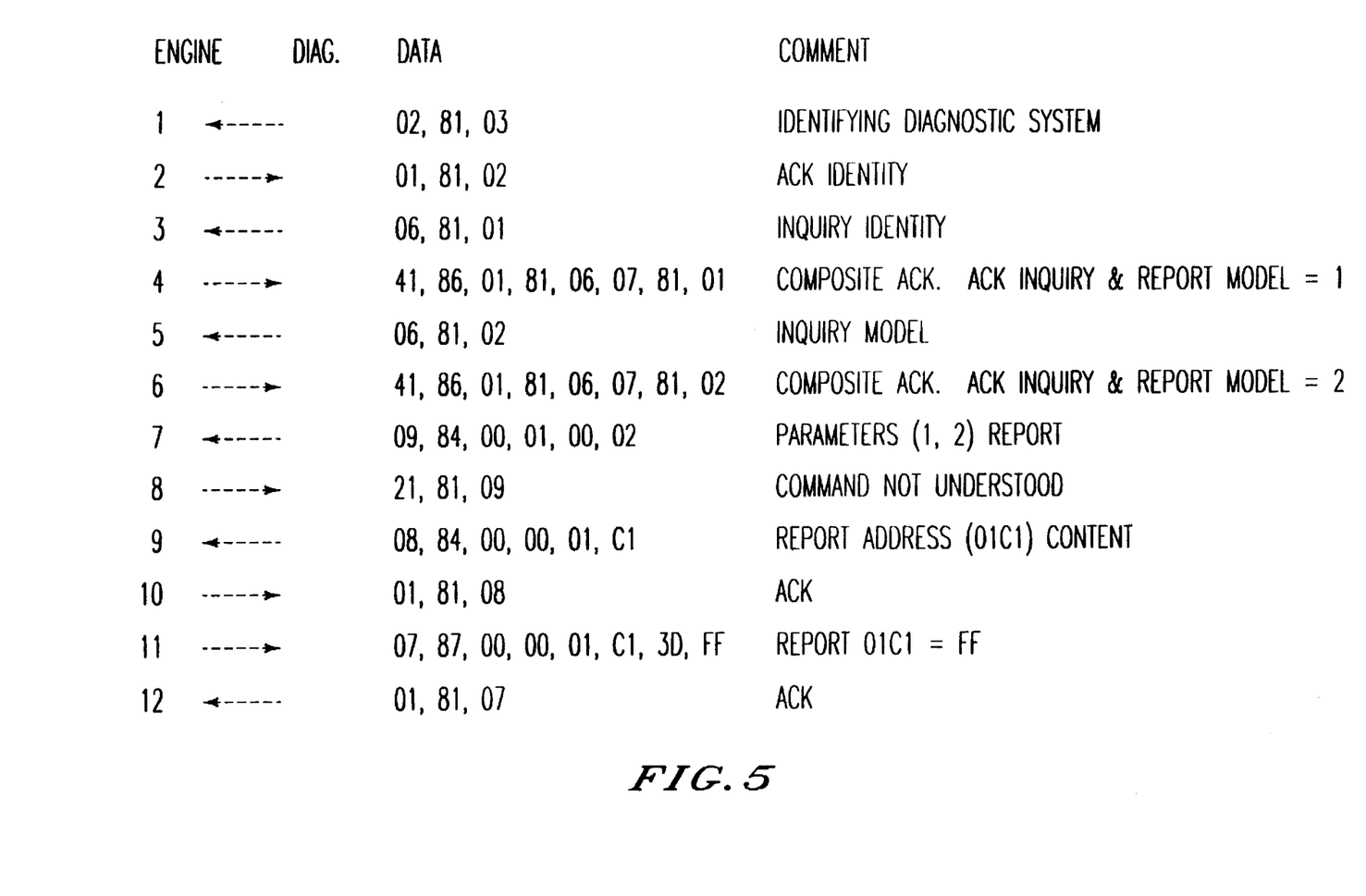
FIG. 5 depicts an example of how a diagnostic station can be connected in accordance with the present invention.

FIG. 5 illustrates the process of establishing the connection between Diagnostic Station 30 and Copier Engine 10 of FIGS. 1 and 2. It is assumed that the engine power is on. FIG. 5 illustrates the use of Composite information field on lines 4 and 6. If Composite is not used, communication such as lines 10 through 12 is needed.

Step 1 in FIG. 5 illustrates the identifying of the diagnostic system, and step 2 illustrates the acknowledgement of the identification.

Step 3 illustrates the identification inquiry, and step 4 illustrates a composite acknowledgement.

Step 5 inquires as to the model identification, and step 6 is the corresponding acknowledgement.

Step 7 asks for a report of parameters end, as an illustration, step 8 illustrates the command is not understood.

Step 9 illustrates a reporting of address, and steps 10, 11 and 12 reflect the acknowledgement, report and acknowledgement, respectively.

Figure 6:
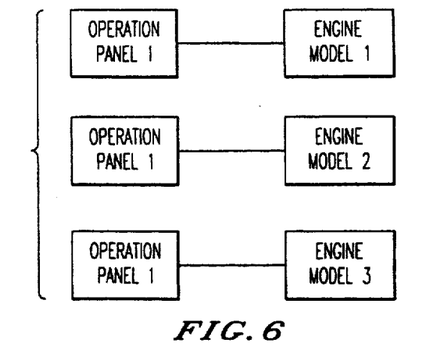
FIGS. 6–8 show examples of other embodiments of the present invention.

FIG. 6 shows an example of another embodiment of the present invention in which an operation panel 1 can control different types of engine models identified as Engine Model 1, Model 2 and Model 3.

Figure 7:
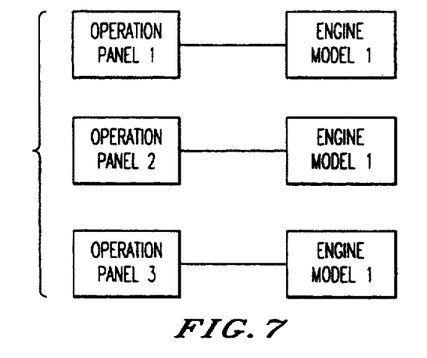

FIG. 7 shows an embodiment of the invention in which different operation panels such as panels 1, 2 or 3 can control the same engine models identified as engine model 1.

Figure 8:
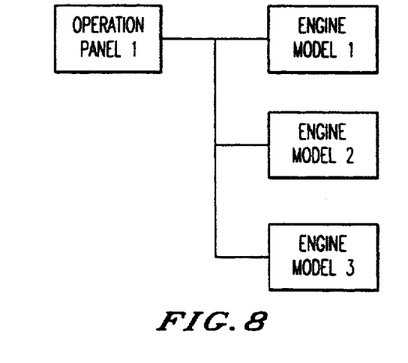

Finally, FIG. 8 shows an operation panel 1 controlling different engine models, identified as engine models 1, 2 and 3. In FIG. 8, operation panel 1 could control models 1, 2 or 3 by a suitable bus interconnection and suitable multiplexing capability.

In conclusion, the present invention provides a means and corresponding method for controlling, monitoring and communicating with office equipment devices by using the following:

Means to control various activities of the system (System Control Process)

Means to store static data (Static State Data)

Means to store semi-static data (Semi-Dynamic State Data)

Means to store dynamic data (Dynamic State Data)

Means to monitor the state of the device (Monitoring Process)

Means to get the state of device from the monitoring means and store the state into the storage of dynamic data (Monitoring Process→System Control Process)→Dynamic State Data)

Means to communicate other devices such as RS232 or modem/telephone (Communication Process)

Means to identify itself to other devices (Communication Process)

Means to exchange commands and data such as reply (Communication with Process)

Means to interpret commands (System Control Process)

Means to take actions based upon the commands (System Control Process)

Means to send results of actions (System Control Process→Communication Process)

Means to notify when the new communication line is established (Communication Process→System Control Process: Interface Unit–interrupt→CPU)

The foregoing description of the preferred embodiment of the present invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the present invention be defined only by the claims appended hereto.

What is claimed is:

1. A method for controlling communication of data between an office device and a remote terminal through a communication line, wherein first data is defined to be data generated within said office device and second data is defined to be data generated within said remote terminal, said method comprising the steps of:

communicating said first data from said office device to said remote terminal, said communicating step including:

generating said first data at said office device, transmitting said first data from a communication interface of said office device to a communication interface of said remote terminal through said communication line, processing said first data by the remote terminal; and communicating said second data from said remote terminal to said office device by performing the steps of:

generating said second data at the remote terminal, transmitting said second data from a communication interface of said remote terminal to said office device communication interface through said communication line, processing said second data by said office device and controlling said office device in response to the processing by the office device, said method further comprising the step of storing static data representing characteristics of said office device which do not change over a life of said office device;

wherein the step of transmitting said first data also transmits the static data to the remote terminal.

2. A method according to claim 1, wherein:

said step of storing static data includes storing a model number of the office device; and said step of transmitting said first data transmits the model number.

3. A method according to claim 1, wherein:

said step of storing static data includes storing a serial number of the office device; and said step of transmitting said first data transmits the serial number.

4. A method according to claim 1, wherein:

said step of storing static data includes storing model characteristics of the office device; and said step of transmitting said first data transmits the model characteristics.

5. A method for controlling communication of data between an office device and a remote terminal through a communication line, wherein first data is defined to be data generated within said office device and second data is defined to be data generated within said remote terminal, said method comprising the steps of:

communicating said first data from said office device to said remote terminal, said communicating step including:

generating said first data at said office device, transmitting said first data from a communication interface of said office device to a communication interface of said remote terminal through said communication line, processing said first data by the remote terminal; and communicating said second data from said remote terminal to said office device by performing the steps of:

generating said second data at the remote terminal, transmitting said second data from a communication interface of said remote terminal to said office device communication interface through said communication line, processing said second data by said office device and controlling said office device in response to the processing by the office device, said method further comprising the step of storing semi-static data representing characteristics of said office device which infrequently change over a life of said office device;

wherein the step of transmitting said first data also transmits the semi-static data to the remote terminal.

6. A method according to claims 1 or 5, wherein said second data is data for controlling the office device.

7. A method according to claims 1 or 5, further comprising the step of storing dynamic state data representing characteristics of said office device which change according to at least one of a mechanical and an electrical state of said office device;

wherein the step of transmitting said first data also transmits the dynamic state data to the remote terminal.

8. A method according to claim 7, wherein said step of storing dynamic state data stores a status of paper in a paper tray; and wherein the step of transmitting said first data also transmits the dynamic state data which includes the status of the paper in the paper tray.

9. A method according to claim 8, wherein a plurality of office devices are connected to the remote terminal and said method further comprises the step of:

transmitting dynamic state data from a second office device to the remote terminal.

10. A method according to claim 8, wherein:

said step of generating first data generates the first data to include an identification of the office device; and said step of transmitting said first data transmits the first data which includes the identification of the office device.

11. A method according to claim 8 wherein:

said office device is a copier;

said step of communicating said first data communicates said first data from said copier to said remote terminal; and said step of communicating said second data communicates said second data from said remote terminal to said copier.

12. A method according to claim 8 wherein:

said office device is a printer;

said step of communicating said first data communicates said first data from said printer to said remote terminal; and said step of communicating said second data communicates said second data from said remote terminal to said printer.

13. A method according to claim 8 wherein:

said office device is a facsimile machine;

said step of communicating said first data communicates said first data from said facsimile machine to said remote terminal; and said step of communicating said second data communicates said second data from said remote terminal to said facsimile machine.

14. A method according to claim 7, wherein said step of storing dynamic state data stores a number of prints; and wherein the step of transmitting said first data also transmits the dynamic state data which includes the number of prints.

15. A method according to claim 14, wherein a plurality of office devices are connected to the remote terminal and said method further comprises the step of:

transmitting dynamic state data from a second office device to the remote terminal.

16. A method according to claim 14, wherein:

said step of generating first data generates the first data to include an identification of the office device; and said step of transmitting said first data transmits the first data which includes the identification of the office device.

17. A method according to claim 14 wherein:

said office device is a copier;

said step of communicating said first data communicates said first data from said copier to said remote terminal; and said step of communicating said second data communicates said second data from said remote terminal to said copier.

18. A method according to claim 14 wherein:

said office device is a printer;

said step of communicating said first data communicates said first data from said printer to said remote terminal; and said step of communicating said second data communicates said second data from said remote terminal to said printer.

19. A method according to claim 14 wherein:

said office device is a facsimile machine;

said step of communicating said first data communicates said first data from said facsimile machine to said remote terminal; and said step of communicating said second data communicates said second data from said remote terminal to said facsimile machine.

20. A method according to claim 7, wherein said step of storing dynamic state data stores a sensitivity of a photoreceptor of the office device; and wherein the step of transmitting said first data also transmits the dynamic state data which includes the sensitivity of the photoreceptor.

21. A method according to claim 20, wherein a plurality of office devices are connected to the remote terminal and said method further comprises the step of:

transmitting dyamic state data from a second office device to the remote terminal.

22. A method according to claim 20, wherein:

said step of generating first data generates the first data to include an identification of the office device; and said step of transmitting said first data transmits the first data which includes the identification of the office device.

23. A method according to claim 20 wherein:

said office device is a copier;

said step of communicating said first data communicates said first data from said copier to said remote terminal; and said step of communicating said second data communicates said second data from said remote terminal to said copier.

24. A method according to claim 20 wherein:

said office device is a printer;

said step of communicating said first data communicates said first data from said printer to said remote terminal; and said step of communicating said second data communicates said second data from said remote terminal to said printer.

25. A method according to claim 20 wherein:

said office device is a facsimile machine;

said step of communicating said first data communicates said first data from said facsimile machine to said remote terminal; and said step of communicating said second data communicates said second data from said remote terminal to said facsimile machine.

26. A method according to claim 7, wherein said step of storing dynamic state data stores paper locations of the office machine; and wherein the step of transmitting said first data also transmits the dynamic state data which includes the paper locations.

27. A method according to claim 26, wherein a plurality of office devices are connected to the remote terminal and said method further comprises the step of:

transmitting dynamic state data from a second office device to the remote terminal.

28. A method according to claim 26, wherein:

said step of generating first data generates the first data to include an identification of the office device; and said step of transmitting said first data transmits the first data which includes the identification of the office device.

29. A method according to claim 26 wherein:

said office device is a copier;

said step of communicating said first data communicates said first data from said copier to said remote terminal; and said step of communicating said second data communicates said second data from said remote terminal to said copier.

30. A method according to claim 26 wherein:

said office device is a printer;

said step of communicating said first data communicates said first data from said printer to said remote terminal; and said step of communicating said second data communicates said second data from said remote terminal to said printer.

31. A method according to claim 26 wherein:

said office device is a facsimile machine;

said step of communicating said first data communicates said first data from said facsimile machine to said remote terminal; and said step of communicating said second data communicates said second data from said remote terminal to said facsimile machine.

32. A method according to claim 7, wherein a plurality of office devices are connected to the remote terminal and said method further comprises the step of:

transmitting dynamic state data from a second office device to the remote terminal.

33. A method according to claim 7, wherein:

said step of generating first data generates the first data to include an identification of the office device; and said step of transmitting said first data transmits the first data which includes the identification of the office device.

34. A method according to claim 7 wherein:

said office device is a copier;

said step of communicating said first data communicates said first data from said copier to said remote terminal; and said step of communicating said second data communicates said second data from said remote terminal to said copier.

35. A method according to claim 7 wherein:

said office device is a printer;

said step of communicating said first data communicates said first data from said printer to said remote terminal; and said step of communicating said second data communicates said second data from said remote terminal to said printer.

36. A method according to claim 7 wherein:

said office device is a facsimile machine;

said step of communicating said first data communicates said first data from said facsimile machine to said remote terminal; and said step of communicating said second data communicates said second data from said remote terminal to said facsimile machine.

37. A method according to claim 5, wherein:

said step of storing semi-static data includes storing a ROM version of the office device; and said step of transmitting said first data transmits the ROM version.

38. A method according to claim 5, wherein:

said step of storing semi-static data includes storing an option configuration of the office device; and said step of transmitting said first data transmits the option configuration.

39. A method according to one of claims 1–5, 37 or 38 wherein a plurality of office devices are connected to the remote terminal and said method further comprises the step of:

transmitting data from a second office device to the remote terminal.

40. A method according to one of claims 1–5, 37 or 38 wherein:

said step of generating first data generates the first data to include an identification of the office device; and said step of transmitting said first data transmits the first data which includes the identification of the office device.

41. A method according to one of claims 1–5, 37 or 38 wherein:

said office device is a copier;

said step of communicating said first data communicates said first data from said copier to said remote terminal; and said step of communicating said second data communicates said second data from said remote terminal to said copier.

42. A method according to one of claims 1–5, 37 or 38 wherein:

said office device is a printer;

said step of communicating said first data communicates said first data from said printer to said remote terminal; and said step of communicating said second data communicates said second data from said remote terminal to said printer.

43. A method according to one of claims 1–5, 37 or 38 wherein:

said office device is a facsimile machine;

said step of communicating said first data communicates said first data from said facsimile machine to said remote terminal; and said step of communicating said second data communicates said second data from said remote terminal to said facsimile machine.

44. A method according to claims 1 or 5, further comprising the step of:

transmitting a message from the office device to the remote terminal to notify the remote terminal of an abnormal condition within the office device.

45. A method according to claim 44, wherein a plurality of office devices are connected to the remote terminal and said method further comprises the step of:

transmitting dynamic state data from a second office device to the remote terminal.

46. A method according to claim 44, wherein:

said step of generating first data generates the first data to include an identification of the office device; and said step of transmitting said first data transmits the first data which includes the identification of the office device.

47. A method according to claim 44 wherein:

said office device is a copier;

said step of communicating said first data communicates said first data from said copier to said remote terminal; and said step of communicating said second data communicates said second data from said remote terminal to said copier.

48. A method according to claim 44 wherein:

said office device is a printer;

said step of communicating said first data communicates said first data from said printer to said remote terminal; and said step of communicating said second data communicates said second data from said remote terminal to said printer.

49. A method according to claim 44 wherein:

said office device is a facsimile machine;

said step of communicating said first data communicates said first data from said facsimile machine to said remote terminal; and said step of communicating said second data communicates said second data from said remote terminal to said facsimile machine.

50. A method of communication between a business office machine system connected to a first end of a communication line and a remote terminal connected to a second end of said communication line, comprising the steps of:

generating, by the business office machine system, data including a source identification of said data, storing said data in a memory;

processing said data and controlling said business office machine system in response to the processing of said data; and transmitting said processed data through an interface to said first end of said communication line;

receiving said data by the remote terminal connected to said second end of said communication line;

transmitting said received data through an interface to a processor of the remote terminal;

processing said data received through the interface by the processor of the remote terminal, said method further comprising the step of:

sending a command from the remote terminal to the business office machine system over the communication line which initiates a diagnostic operation in the business office machine system;

wherein said step of transmitting said processed data is performed after the sending of the command which initiates the diagnostic operation in the business office machine system.

51. A method of communication between a business office machine system connected to a first end of a communication line and a remote terminal connected to a second end of said communication line, comprising the steps of:

generating, by the business office machine system, data including a source identification of said data, storing said data in a memory;

processing said data and controlling said business office machine system in response to the processing of said data; and transmitting said processed data through an interface to said first end of said communication line;

receiving said data by the remote terminal connected to said second end of said communication line;

transmitting said received data through an interface to a processor of the remote terminal;

processing said data received through the interface by the processor of the remote terminal, said method further comprising the step of:

sending a command from the remote terminal to the business office machine system over the communication line which initiates a diagnostic operation in the business office machine system.

52. A method according to claims 50 or 51, wherein after said step of transmitting data to the processor of the remote terminal, additional data is transferred from the business office machine system to the remote terminal.

53. A method according to claims 50 or 51, further comprising the step of:

sending a message by the business office machine system to the remote terminal in order to notify the remote terminal of an abnormal state within the business office machine system.

54. A method according to claims 50 or 51, wherein:

a second business office machine system is connected to the remote terminal and said second business office machine system performs the steps of:

generating, by the second business office machine system, third data including a source identification of said third data, storing said third data generated by the second business office machine system in a memory of the second business office machine system;

processing said third data and controlling said second business office machine system in response to the processing of said third data; and transmitting said processed third data through an interface to said remote terminal.

55. A method according to claims 50 or 51, further comprising the step of:

transmitting data from the remote terminal to the business office machine system in response to the processing by the processor of the remote terminal.

56. A method according to claim 51, further comprising the step of:

transmitting a message from the business office machine system to the remote terminal to notify the remote terminal of an abnormal condition within the business office machine system.

57. A system, comprising:

an office machine system communicating with a first end of a communication line, said office machine system including:
- a state data generator;
- a memory, coupled to said state data generator, which stores the state data generated by the state data generator;
- a processor, coupled to said memory, which processes the state data and controls said office machine system in response to said processing, and
- a communication interface having an output coupled to said first end of said communication line and an input coupled to said processor through which said state data is transmitted to said first end of the communication line; and a diagnostic processor, connected to a second end of said communication line, which processes said state data received from said office machine system to diagnose an operation of the office machine system and to communicate interactively with the office machine system wherein:

said diagnostic processor includes means for sending a command from the diagnostic processor to the office machine system over the communication line which initiates a diagnostic operation in the office machine system; and data is transmitted from the office machine system to the diagnostic processor over the communication line after the diagnostic operation is initiated.

58. A system, comprising:

an office machine system communicating with a first end of a communication line, said office machine system including:
- a state data generator;
- a memory, coupled to said state data generator, which stores the state data generated by the state data generator;
- a processor, coupled to said memory, which processes the state data and controls said office machine system in response to said processing, and
- a communication interface having an output coupled to said first end of said communication line and an input coupled to said processor through which said state data is transmitted to said first end of the communication line; and a diagnostic processor, connected to a second end of said communication line, which processes said state data received from said office machine system to diagnose an operation of the office machine system and to communicate interactively with the office machine system, wherein:

said diagnostic processor includes means for sending a command from the diagnostic processor to the office machine system over the communication line which initiates a diagnostic operation in the office machine system.

59. A system according to claims 57 or 58, wherein said office machine system is selected from the group consisting of a copier, a facsimile machine, and a printer.

60. A system according to claims 57 or 58, wherein:

said office machine system further comprises a control data generator; and said processor of said office machine system processes the control data and the state data and controls said office machine system in response to said processing.

61. A system according to claims 57 or 58, further comprising:

means for transmitting data through the communication interface over the communication line to the diagnostic processor; and means for transmitting additional data through the communication interface over the communication line to the diagnostic processor.

62. A system according to claims 57 or 58, further comprising:

means for sending a message by the business office machine system to the diagnostic processor in order to notify the diagnostic processor of an abnormal state within the business office machine system.

63. A system according to claims 57 or 58, further comprising a second office machine system connected to the diagnostic processor, comprising:

- a state data generator;
- a memory, coupled to said state data generator of the second office machine system, which stores the state data generated by the state data generator of the second office machine system;
- a processor, coupled to said memory of the second office machine system, which processes the state data of the second office machine system and controls said second office machine system in response to said processing; and
- a communication interface having an output coupled to a second communication line connected to said diagnostic processor and an input coupled to said processor of the second office machine system.

64. A system according to claims 57 or 58, wherein said diagnostic processor transmits data to the office machine system after processing by the diagnostic processor of the state data.

65. A system according to claims 57 or 58, wherein the office machine system further includes:

means for transmitting a message from the office machine system to the diagnostic processor to notify the diagnostic processor of an abnormal condition within the office machine system.

66. A system according to claims 57 or 58, wherein said diagnostic processor is located in a diagnostic station which is remote from said office machine system.

67. A system according to claims 57 or 58, wherein said office machine system includes a plurality of copiers and an operation terminal and said operation terminal communicates with said plurality of copiers.

68. A system according to claim 67, wherein said plurality of copiers are different model copiers.

69. A system according to claim 68, wherein said operation terminal communicates with said different model copiers by a bus interconnection and uses multiplexing.

* * * * *

UNITED STATES PATENT AND TRADEMARK OFFICE
CERTIFICATE OF CORRECTION

PATENT NO. : 5,537,554
DATED : July 16, 1996
INVENTOR(S) : MOTOYAMA

It is certified that error appears in the above-indentified patent and that said Letters Patent is hereby corrected as shown below:

In column 9, prenumbered line 56, change "claim 7" to --claim 14--.

In column 9, prenumbered line 61, change "claim 7" to --claim 14--.

In column 9, prenumbered line 67, change "claim 7" to --claim 14--.

In column 10, line 8, change "claim 7" to --claim 14--.

In column 10, line 16, change "claim 7" to --claim 14--.

The sheet of drawing consisting of Figures 6, 7 and 18 should be added as per attached sheet.

Signed and Sealed this

Sixth Day of May, 1997

Attest:

BRUCE LEHMAN

Attesting Officer

Commissioner of Patents and Trademarks

UNITED STATES PATENT AND TRADEMARK OFFICE
CERTIFICATE OF CORRECTION

Page 1 of 2

PATENT NO. : 5,537,554
DATED : July 16, 1996
INVENTOR(S) : TETSURO MOTOYAMA

It is certified that error appears in the above-indentified patent and that said Letters Patent is hereby corrected as shown below:

In column 9, prenumbered line 56, change "claim 7" to --claim 14--.

In column 9, prenumbered line 61, change "claim 7" to --claim 14--.

In column 9, prenumbered line 67, change "claim 7" to --claim 14--.

In column 10, line 8, change "claim 7" to --claim 14--.

In column 10, line 16, change "claim 7" to --claim 14--.

The sheet of drawing consisting of Figures 6, 7 and 8 should be added as per attached sheet.

This certificate supersedes Certificate of Correction issued May 6, 1997.

Signed and Sealed this

Second Day of September, 1997

*Attest:*

BRUCE LEHMAN

*Attesting Officer*  *Commissioner of Patents and Trademarks*